(12) United States Patent
Machado et al.

(10) Patent No.: US 11,779,867 B2
(45) Date of Patent: Oct. 10, 2023

(54) MECHANICAL INTERLOCK SYSTEM FOR A FILTER

(71) Applicant: ELECTROLUX HOME PRODUCTS, INC., Charlotte, NC (US)

(72) Inventors: Marcello Correa Machado, Anderson, SC (US); Jeremy Carlton Bowyer, Anderson, SC (US); Thomas W. McCollough, Anderson, SC (US)

(73) Assignee: ELECTROLUX HOME PRODUCTS, INC., Charlotte, NC (US)

( * ) Notice: Subject to any disclaimer, the term of this patent is extended or adjusted under 35 U.S.C. 154(b) by 112 days.

(21) Appl. No.: 17/333,124

(22) Filed: May 28, 2021

(65) Prior Publication Data

US 2022/0379248 A1    Dec. 1, 2022

(51) Int. Cl.
*B01D 35/30*       (2006.01)
*B01D 35/02*       (2006.01)

(52) U.S. Cl.
CPC ......... *B01D 35/306* (2013.01); *B01D 35/02* (2013.01); *B01D 2201/29* (2013.01); *B01D 2201/4053* (2013.01)

(58) Field of Classification Search
CPC .. B01D 35/306; B01D 35/02; B01D 2201/29; B01D 2201/4053; B01D 27/08; B01D 2201/295; B01D 2201/4007; B01D 2201/4061
See application file for complete search history.

(56) References Cited

U.S. PATENT DOCUMENTS

| | | | |
|---|---|---|---|
| 5,753,107 A | 5/1998 | Magnusson et al. |
| 5,826,854 A | 10/1998 | Janvrin et al. |
| 6,027,644 A | 2/2000 | Magnusson et al. |

(Continued)

FOREIGN PATENT DOCUMENTS

| | | |
|---|---|---|
| EP | 3721963 A1 | 10/2020 |
| WO | 0205926 A1 | 1/2002 |

(Continued)

OTHER PUBLICATIONS

Electrolux Home Products, Inc., International Patent Application No. PCT/US2022/019496, International Search Report and Written Opinion, dated May 25, 2022.

*Primary Examiner* — Waqaas Ali
(74) *Attorney, Agent, or Firm* — Moore & Van Allen PLLC; R. W. McCord Rayburn

(57) ABSTRACT

A mechanical interlock system for a fluid filter is described herein. The mechanical interlock system may include a filter cartridge and a filter cartridge manifold for receiving the filter cartridge. The filter cartridge may include a filter body, a fluid inlet and outlet, and an integrated locking head. The integrated locking head may include a key extending radially outward from the integrated locking head and channels on an outer surface of the integrated locking head. The filter cartridge manifold may include an insertion and extraction tube for receiving the key and latching mechanisms. The insertion and extraction tube may include a primary keyway and a secondary keyway. The key, keyways, latching mechanisms, and/or channels may interact to maintain alignment of the filter cartridge during insertion of the filter cartridge into an appliance including the filter cartridge manifold.

28 Claims, 12 Drawing Sheets

(56) References Cited

U.S. PATENT DOCUMENTS

| | | |
|---|---|---|
| 6,120,685 A | 9/2000 | Carlson et al. |
| 6,193,884 B1 | 2/2001 | Magnusson et al. |
| 7,261,815 B2 | 8/2007 | Cur et al. |
| 7,442,301 B2 | 10/2008 | Huda |
| 8,001,801 B2 | 8/2011 | Coleman |
| 8,043,502 B2 | 10/2011 | Nauta |
| 8,097,156 B2 | 1/2012 | Tubby et al. |
| 8,282,820 B2 | 10/2012 | Cur et al. |
| 8,303,813 B2 | 11/2012 | Coleman |
| 8,354,024 B2 | 1/2013 | Ihle et al. |
| 8,505,741 B2 | 8/2013 | Scholz et al. |
| 8,709,246 B2 | 4/2014 | Branscomb |
| 8,911,623 B2 | 12/2014 | Tubby et al. |
| 8,940,164 B2 | 1/2015 | Ferreira et al. |
| 8,950,052 B2 | 2/2015 | Kruckenberg et al. |
| 9,149,745 B2 | 10/2015 | Senninger et al. |
| 9,157,677 B2 | 10/2015 | Mitchell |
| 9,216,914 B2 | 12/2015 | An et al. |
| 9,233,322 B1 | 1/2016 | Huda et al. |
| 9,320,992 B2 | 4/2016 | Braunheim |
| 9,345,995 B2 | 5/2016 | Tubby et al. |
| 9,393,507 B2 | 7/2016 | Nuss |
| 9,487,414 B2 | 11/2016 | An et al. |
| 9,688,546 B2 | 6/2017 | Froelicher et al. |
| 9,789,424 B2 | 10/2017 | Reckin et al. |
| 9,789,427 B2 | 10/2017 | Freystedt et al. |
| 9,796,600 B2 | 10/2017 | Shotey et al. |
| 9,878,273 B2 | 1/2018 | Ergican et al. |
| 10,065,845 B2 | 9/2018 | Lachermeier |
| 10,087,085 B2 | 10/2018 | Baird et al. |
| 10,125,028 B2 | 11/2018 | Lachermeier |
| 10,272,369 B2 | 4/2019 | Zhibin |
| 10,280,552 B2 | 5/2019 | Kulkarni |
| 10,357,727 B2 | 7/2019 | Zhibin |
| 10,543,440 B2 | 1/2020 | Wazana et al. |
| 10,563,908 B2 | 2/2020 | Lachermeier |
| 2002/0017497 A1 | 2/2002 | Fritze |
| 2002/0036162 A1 | 3/2002 | Magnusson et al. |
| 2003/0019805 A1 | 1/2003 | Fritze |
| 2004/0251210 A1 | 12/2004 | Fritze et al. |
| 2005/0103697 A1 | 5/2005 | Magnusson et al. |
| 2006/0070942 A1 | 4/2006 | An |
| 2006/0124532 A1 | 6/2006 | Magnusson et al. |
| 2007/0119768 A1 | 5/2007 | Duplessis et al. |
| 2007/0199876 A1 | 8/2007 | Tubby et al. |
| 2007/0227959 A1 | 10/2007 | Sinur et al. |
| 2008/0000820 A1 | 1/2008 | Mitchell |
| 2008/0156711 A1 | 7/2008 | Vitan et al. |
| 2008/0185330 A1 | 8/2008 | Sinur et al. |
| 2008/0272068 A1 | 11/2008 | Harris |
| 2010/0170857 A1 | 7/2010 | Williams et al. |
| 2011/0174705 A1 | 7/2011 | Branscomb |
| 2011/0284096 A1 | 11/2011 | Coleman |
| 2012/0145621 A1 | 6/2012 | Tubby et al. |
| 2012/0211412 A1 | 8/2012 | Tubby et al. |
| 2013/0068684 A1* | 3/2013 | Kruckenberg ....... B01D 35/306 210/232 |
| 2013/0319929 A1 | 12/2013 | Farley, Jr. |
| 2014/0131290 A1 | 5/2014 | Patera et al. |
| 2014/0166563 A1 | 6/2014 | Tubby et al. |
| 2018/0318738 A1 | 11/2018 | Chernov et al. |
| 2018/0334402 A1 | 11/2018 | Williams et al. |
| 2019/0015774 A1 | 1/2019 | Tirone et al. |
| 2019/0134543 A1 | 5/2019 | Huda et al. |
| 2019/0351353 A1 | 11/2019 | Chandra et al. |
| 2020/0047095 A1 | 2/2020 | Wei |
| 2020/0047106 A1 | 2/2020 | Taylor |
| 2020/0276527 A1 | 9/2020 | Macoretta et al. |

FOREIGN PATENT DOCUMENTS

| | | |
|---|---|---|
| WO | 03011424 A1 | 2/2003 |
| WO | 2006003350 A1 | 1/2006 |
| WO | 2006101364 A1 | 9/2006 |
| WO | 2007012079 A2 | 1/2007 |
| WO | 2008027083 A2 | 3/2008 |
| WO | 2008066961 A1 | 6/2008 |
| WO | 2009062912 A2 | 5/2009 |
| WO | 2009127025 A2 | 10/2009 |
| WO | 2009156509 A1 | 12/2009 |
| WO | 2010033470 A2 | 3/2010 |
| WO | 2012077569 A1 | 6/2012 |
| WO | 2014004559 A1 | 1/2014 |
| WO | 2014150520 A1 | 9/2014 |
| WO | 2014210365 A1 | 12/2014 |
| WO | 2015164528 A1 | 10/2015 |
| WO | 2016139654 A1 | 9/2016 |
| WO | 2018034794 A1 | 2/2018 |
| WO | 2018124752 A1 | 7/2018 |
| WO | 2018142316 A1 | 8/2018 |
| WO | 2018224517 A1 | 12/2018 |

* cited by examiner

MECHANICAL INTERLOCK SYSTEM FOR A FILTER

FIELD OF THE INVENTION

The present invention embraces a mechanical interlock system for a fluid filter, such as a water filter in an appliance (e.g., a refrigerator, a freezer, and/or the like).

BACKGROUND

Appliances, such as refrigerators, freezers, and/or the like, may include one or more components, such as a water dispenser, an ice maker, and/or the like, which use water from a water supply (e.g., a household water supply and/or the like). Such appliances typically include a water filter that filters water received from the water supply before the water is provided to the one or more components. Such water filters have a useful lifespan that is shorter than the appliance and must be replaced for the appliance to continue to provide properly filtered water. Appliances typically include an opening to permit a user to remove an expired water filter and install a replacement water filter.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. This summary presents some concepts of one or more embodiments of the present invention in a simplified form as a prelude to the more detailed description that is presented later.

In one aspect, the present invention embraces a mechanical interlock system, which may include a filter cartridge and a filter cartridge manifold for receiving the filter cartridge. The filter cartridge may include a filter body having a first end, a second end, and a longitudinal axis, a fluid inlet and outlet at the first end of the filter body, and an integrated locking head on the first end of the filter body. The integrated locking head may include a key extending radially outward from the integrated locking head and a channel on an outer surface of the integrated locking head structured for receiving a latching mechanism, preventing rotation of the filter cartridge in a first direction, and permitting rotation of the filter cartridge in a second direction. The filter cartridge manifold may include an insertion and extraction tube for receiving the key and the latching mechanism. The insertion and extraction tube may include a primary keyway and a secondary keyway, where the secondary keyway has an entry end and an exit end, and where the exit end of the secondary keyway connects to the primary keyway. The latching mechanism may be structured to prevent, after being received by the channel, movement of the filter cartridge in a direction along the longitudinal axis that is opposite an insertion direction, prevent rotation of the filter cartridge in the first direction, and permit rotation of the filter cartridge in the second direction.

In some embodiments, during insertion of the filter cartridge into the filter cartridge manifold, the key passes through the primary keyway.

In some embodiments, when the key is positioned in the primary keyway, the primary keyway prevents rotation of the filter cartridge, aligns the latching mechanism with the channel, and aligns the fluid inlet and outlet of the filter cartridge with a fluid connector of the filter cartridge manifold, and wherein the filter cartridge manifold is positioned in an appliance.

In some embodiments, an end portion of the primary keyway includes a sidewall configured to interact with the key to prevent rotation of the filter cartridge in a first direction, and the end portion permits rotation of the filter cartridge in a second direction. Additionally, or alternatively, after insertion of the filter cartridge into the filter cartridge manifold, a vertical sidewall of the latching mechanism interacts with a vertical sidewall of the channel to prevent rotation of the filter cartridge in the first direction. In some embodiments, after insertion of the filter cartridge into the filter cartridge manifold, a filleted sidewall of the latching mechanism interacts with a filleted sidewall of the channel to permit rotation of the filter cartridge in the second direction. Additionally, or alternatively, after insertion of the filter cartridge into the filter cartridge manifold and during rotation of the filter cartridge in the second direction the filleted sidewall of the latching mechanism interacts with the filleted sidewall of the channel to force the latching mechanism to flex radially outward and slide over an outer circumference of the integrated locking head and the key rotates toward the entry end of the secondary keyway.

In some embodiments, the filter cartridge manifold may include a spring element and a pusher component spring-loaded by the spring element and configured to provide a compressive force against the integrated locking head.

In another aspect, the present invention embraces a filter cartridge. The filter cartridge may include a filter body having a first end, a second end, and a longitudinal axis, a fluid inlet and outlet at the first end of the filter body, and an integrated locking head on the first end of the filter body. The integrated locking head may include a channel on an outer surface of the integrated locking head, where the channel is configured to receive a latching mechanism of a filter cartridge manifold, and where the channel includes a filleted sidewall at a first end of the channel and a vertical sidewall at a second end of the channel.

In some embodiments, the channel may include a chamfered edge oriented towards the fluid inlet and outlet, where insertion of the filter cartridge into the filter cartridge manifold causes the chamfered edge of the channel to interact with a chamfered inner edge of the latching mechanism forcing the latching mechanism to flex radially outward. Additionally, or alternatively, after insertion of the filter cartridge into the filter cartridge manifold, the chamfered inner edge of the latching mechanism is structured to sit within the channel and prevent movement of the filter cartridge in a direction along the longitudinal axis that is opposite an insertion direction.

In some embodiments, after insertion of the filter cartridge into the filter cartridge manifold, a vertical sidewall of the latching mechanism is structured to interact with the vertical sidewall of the channel to prevent rotation of the filter cartridge in a first direction.

In some embodiments, after insertion of the filter cartridge into the filter cartridge manifold, a filleted sidewall of the latching mechanism is structured to interact with the filleted sidewall of the channel to permit rotation of the filter cartridge in a second direction. Additionally, or alternatively, after insertion of the filter cartridge into the filter cartridge manifold and during rotation of the filter cartridge in the second direction, the filleted sidewall of the latching mechanism is structured to interact with the filleted sidewall of the channel to force the latching mechanism to flex radially outward and slide over an outer circumference of the integrated locking head.

In some embodiments, the channel is a first channel, and the integrated locking head includes a second channel on the outer surface of the integrated locking head, where the first channel and the second channel are diametrically opposed on the outer surface of the integrated locking head.

In some embodiments, the integrated locking head may include a key extending radially outward from the integrated locking head. Additionally, or alternatively, during insertion of the filter cartridge into a filter cartridge manifold, the key is structured to pass through a primary keyway of an insertion and extraction tube of the filter cartridge manifold. In some embodiments, when the key is positioned in a primary keyway of an insertion and extraction tube of a filter cartridge manifold, the primary keyway is structured to prevent rotation of the filter cartridge. Additionally, or alternatively, the key may have a rhomboid-shape and a radially-outward-facing surface that is sloped radially inward from a center of the radially-outward-facing surface.

In yet another aspect, the present invention embraces a method. The method may include providing a filter cartridge including an integrated locking head, where the integrated locking head includes a channel on an outer surface of the integrated locking head, and where the channel is structured to receive a latching mechanism. The method may include, while inserting, engaging the integrated locking head with the latching mechanism forcing the latching mechanism to flex radially outward. The method may include, while inserting and after forcing the latching mechanism to flex radially outward, positioning the latching mechanism in the channel.

In some embodiments, the method may include, while inserting, overcoming a force applied to the integrated locking head in an extraction direction opposite the insertion direction.

In some embodiments, the integrated locking head may include a key extending radially outward from the integrated locking head, and the method may include, before inserting, aligning the key with a keyway of the filter cartridge manifold.

In some embodiments, the method may include, while the latching mechanism is positioned in the channel, preventing movement of the filter cartridge in an extraction direction opposite the insertion direction and preventing, with a vertical sidewall of the channel and a vertical sidewall of the latching mechanism, rotation of the filter cartridge in a first direction. Additionally, or alternatively, the method may include, while the latching mechanism is positioned in the channel, permitting, with a filleted sidewall of the channel and a filleted sidewall of the latching mechanism, rotation of the filter cartridge in a second direction opposite the first direction.

In some embodiments, the method may include, after positioning the latching mechanism in the channel, rotating the filter cartridge in the second direction. Additionally, or alternatively, the method may include, while rotating the filter cartridge in the second direction, forcing, with a filleted sidewall of the channel and a filleted sidewall of the latching mechanism, the latching mechanism to flex radially outward and engage an outer surface of the integrated locking head.

In some embodiments, the method may include, after forcing the latching mechanism to flex radially outward and engage the outer surface of the integrated locking head, pushing the integrated locking head in an extraction direction opposite the insertion direction. Additionally, or alternatively, the integrated locking head may include a key extending radially outward from the integrated locking head, and the method may include, after forcing the latching mechanism to flex radially outward and engage an outer surface of the integrated locking head, pulling the filter cartridge in an extraction direction opposite the insertion direction causing the key to enter a secondary keyway, of the filter cartridge manifold, that intersects with a primary keyway, of the filter cartridge manifold, through which the key passed while inserting the filter cartridge into the filter cartridge manifold.

In some embodiments, the method may include, while pulling the filter cartridge in the extraction direction, pulling the key through the secondary keyway and into the primary keyway and, while pulling the filter cartridge in the extraction direction and pulling the key through the secondary keyway, rotating the filter cartridge in the first direction. Additionally, or alternatively, the method may include, while pulling the filter cartridge in the extraction direction, pulling the key through the primary keyway and withdrawing the filter cartridge from the appliance.

The features, functions, and advantages that have been discussed may be achieved independently in various embodiments of the present invention or may be combined with yet other embodiments, further details of which may be seen with reference to the following description and drawings.

BRIEF DESCRIPTION OF THE DRAWINGS

Figure 1:
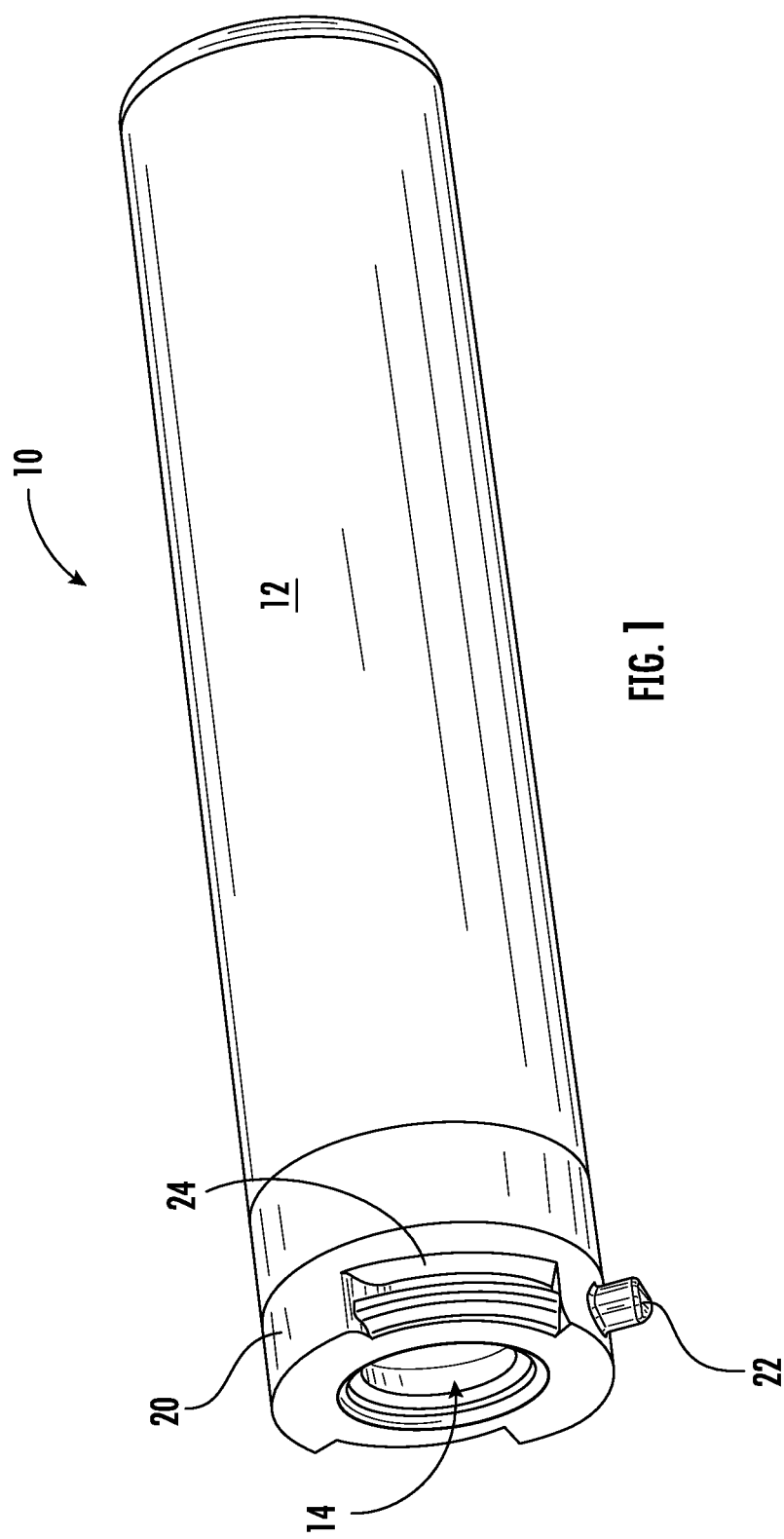
Figure 2:
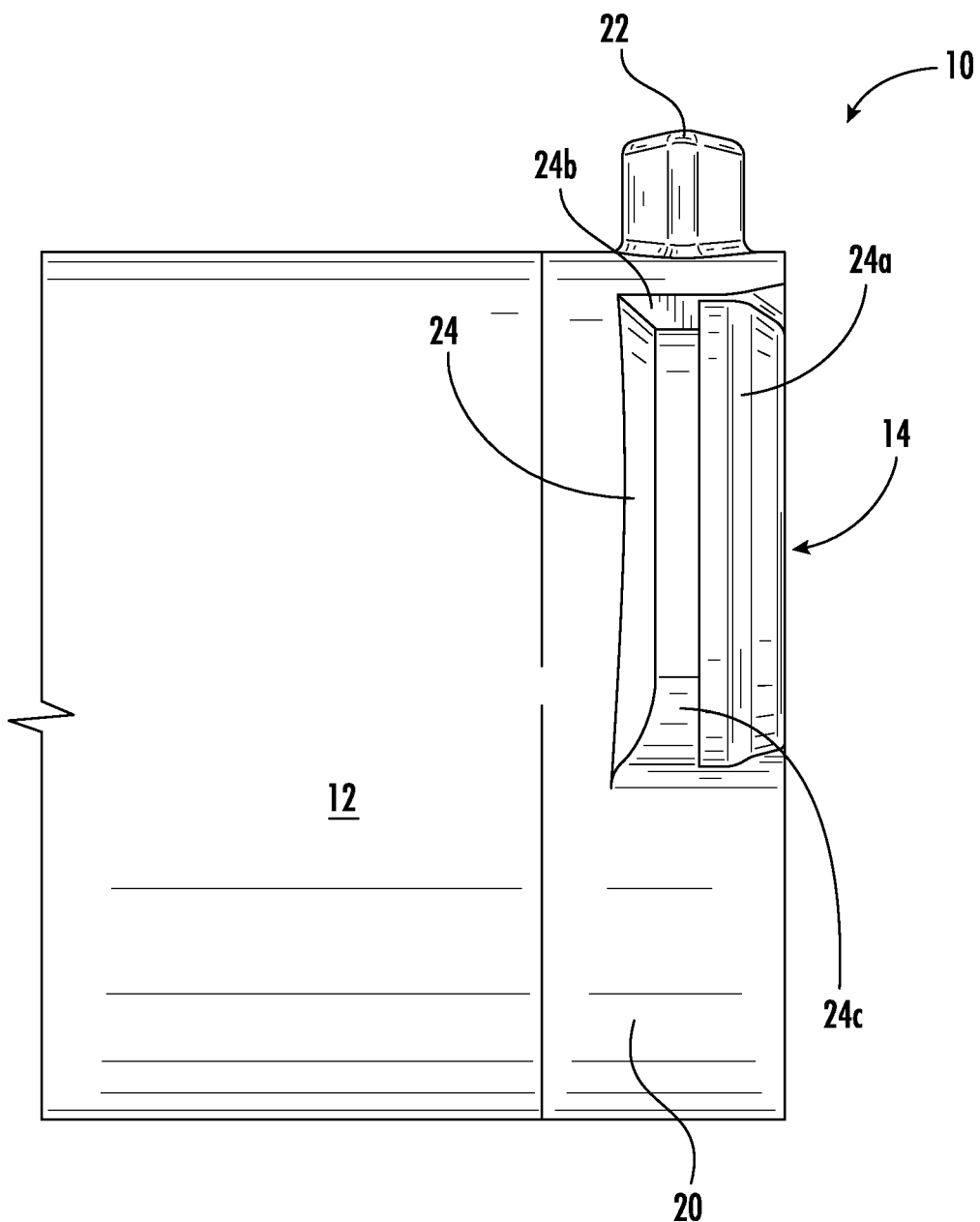
Figure 3:
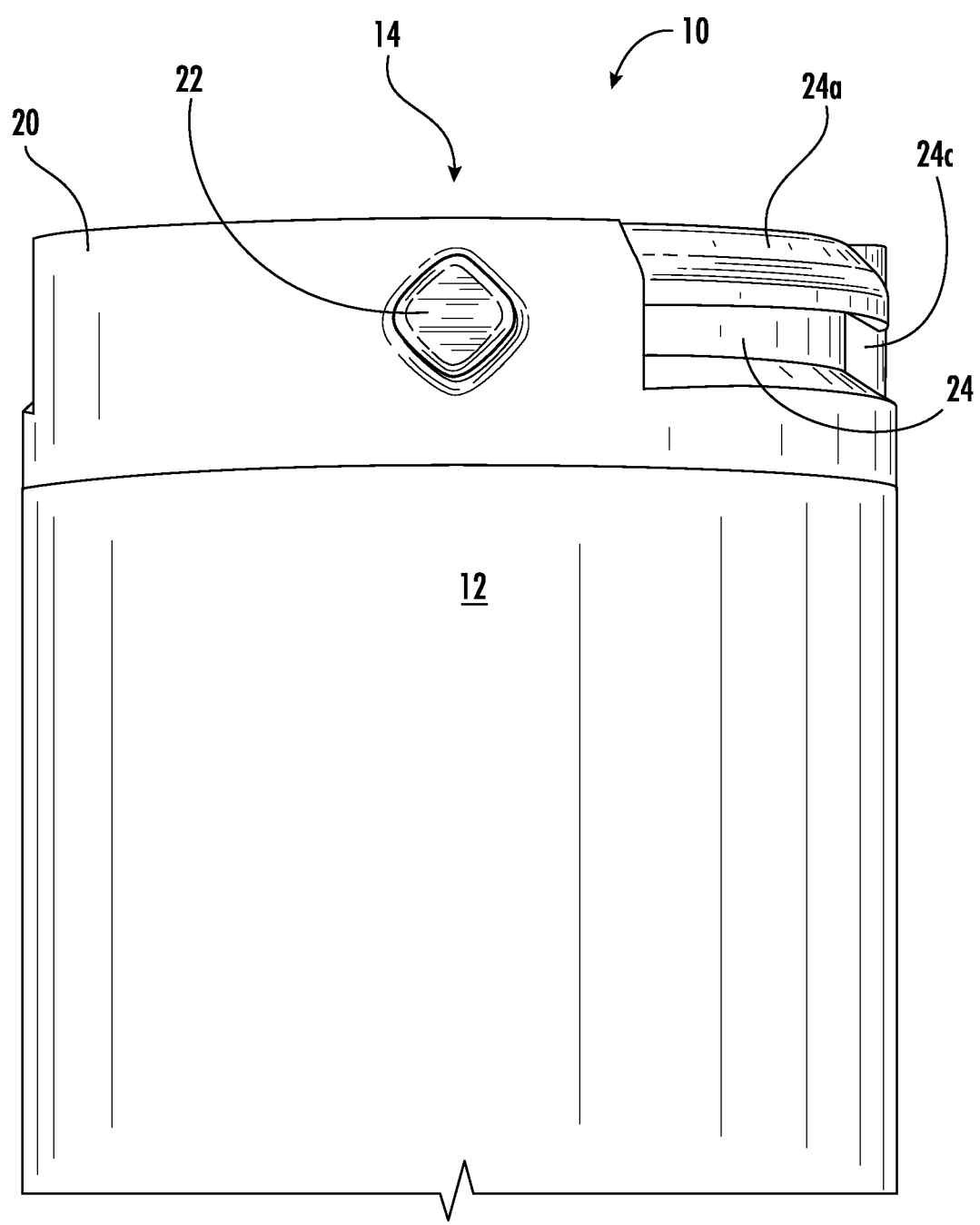
Figure 4:
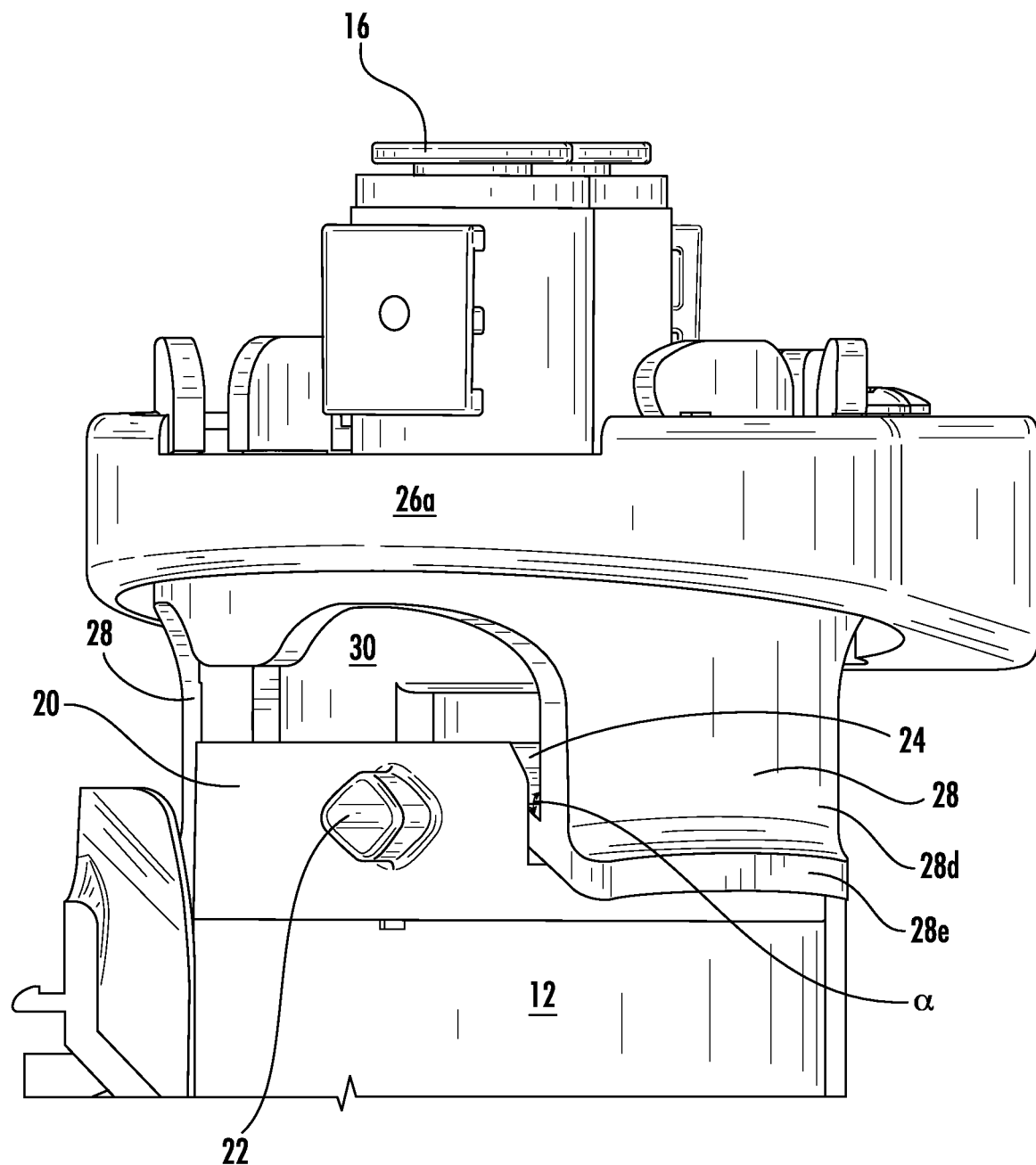
Figure 5:
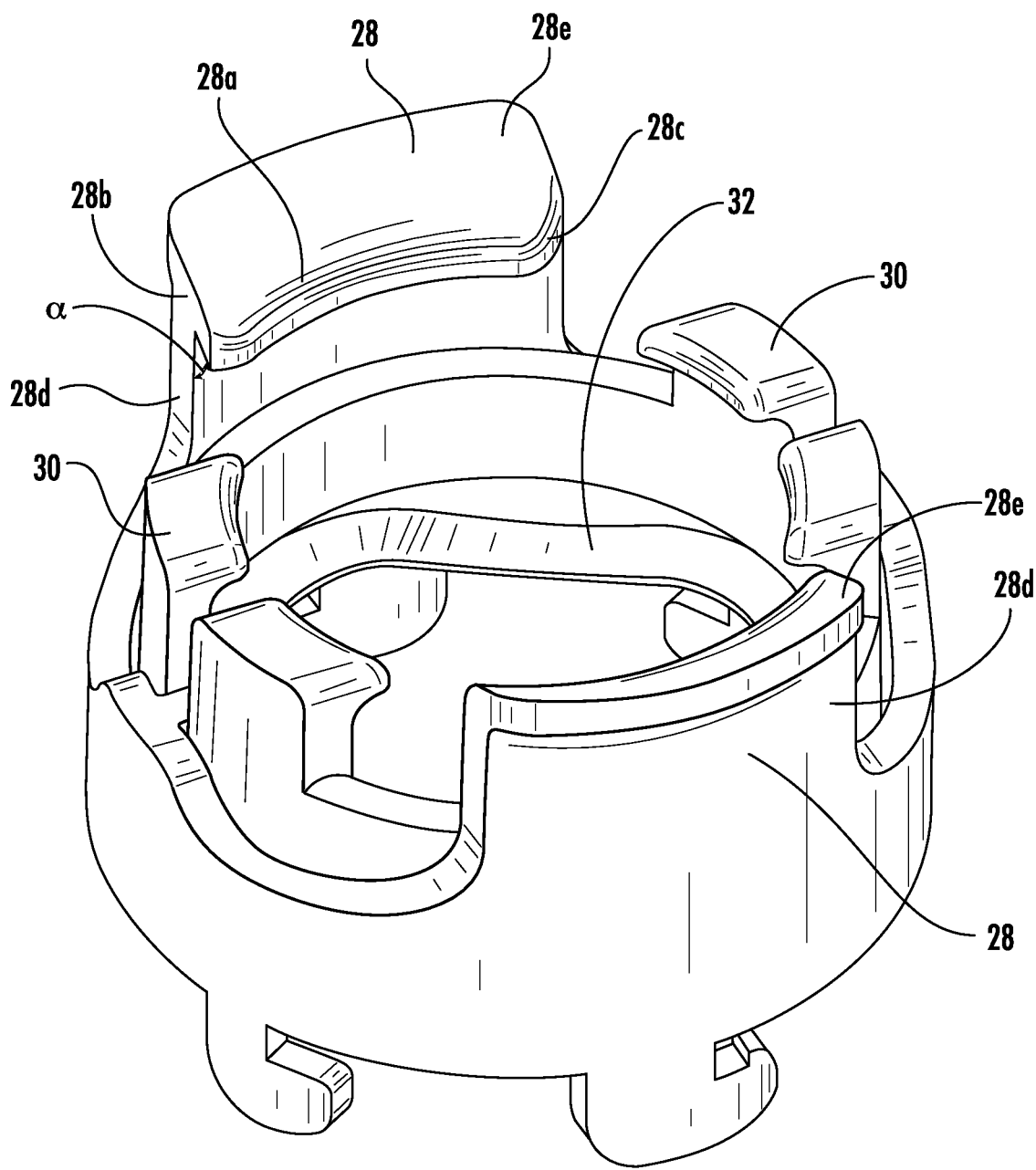
Figure 6:
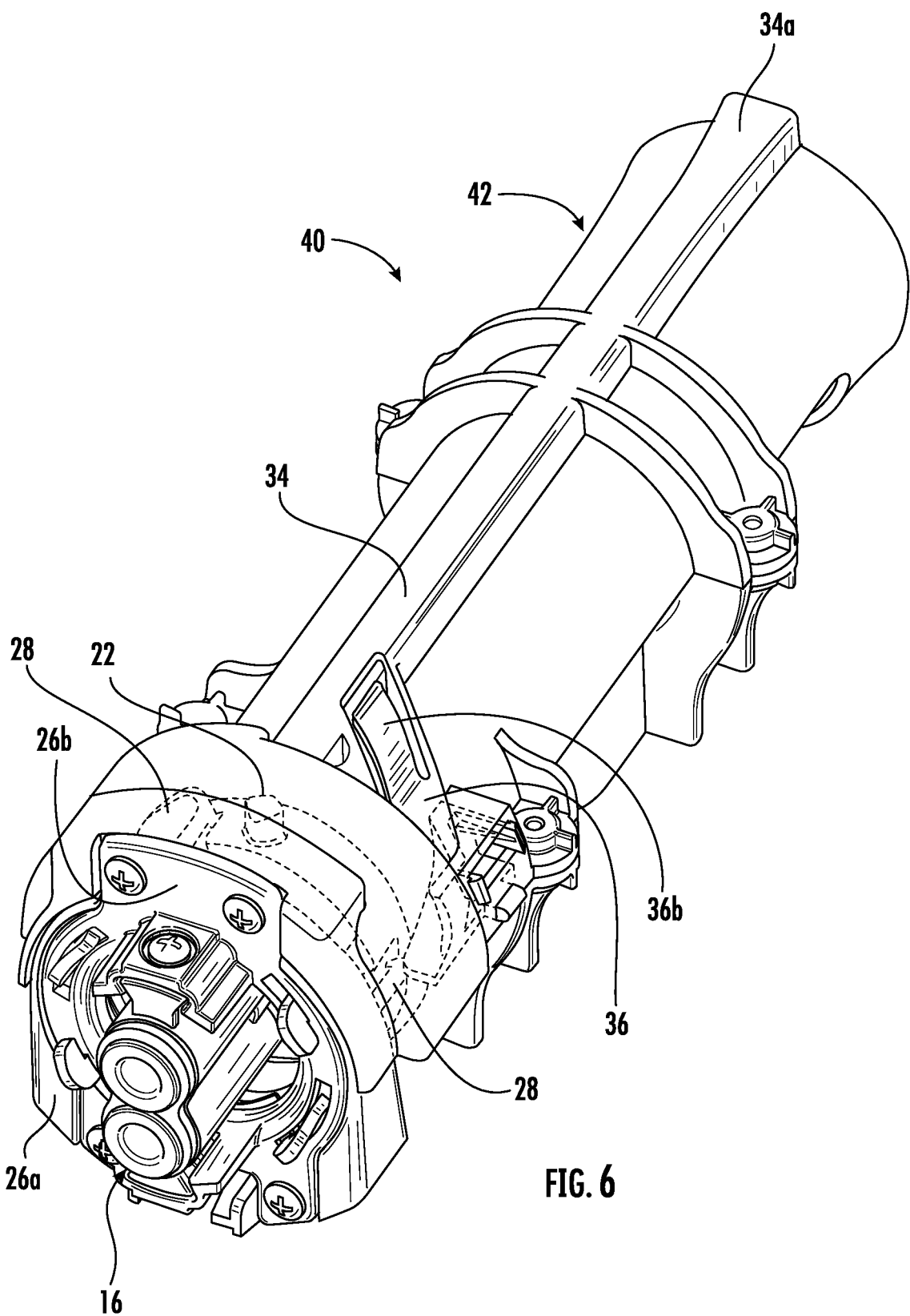
Figure 7:
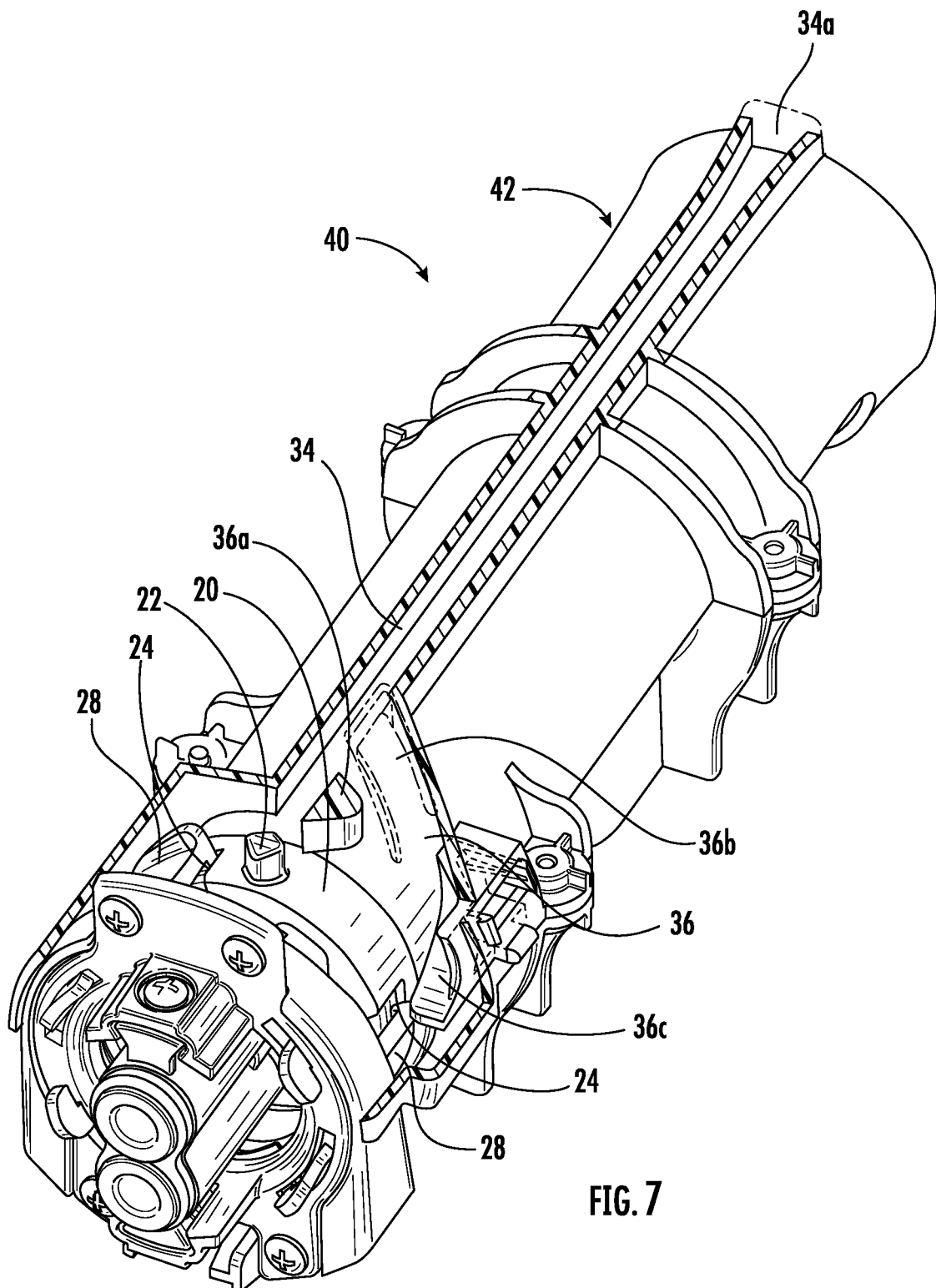
Figure 8:
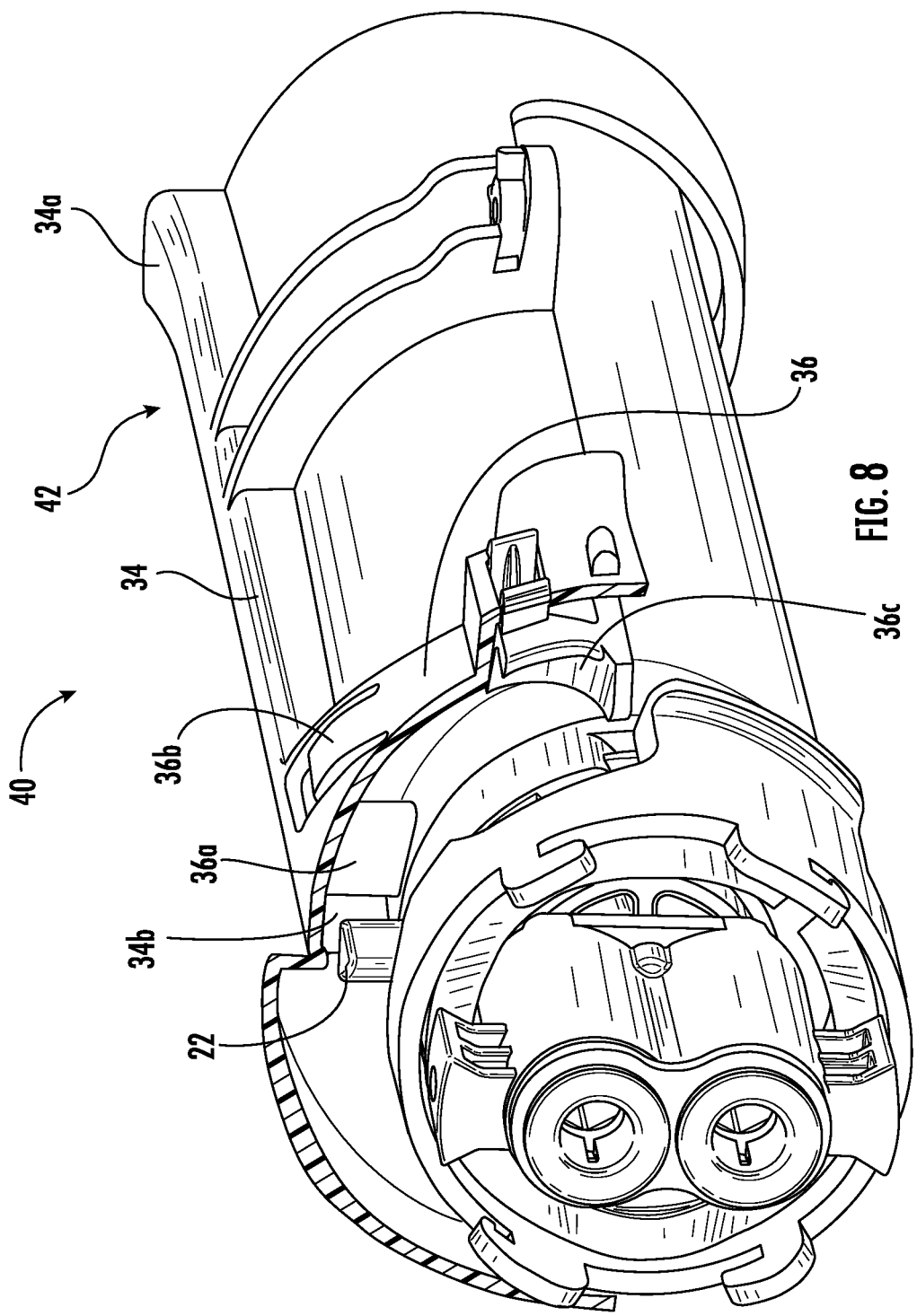
Figure 9:
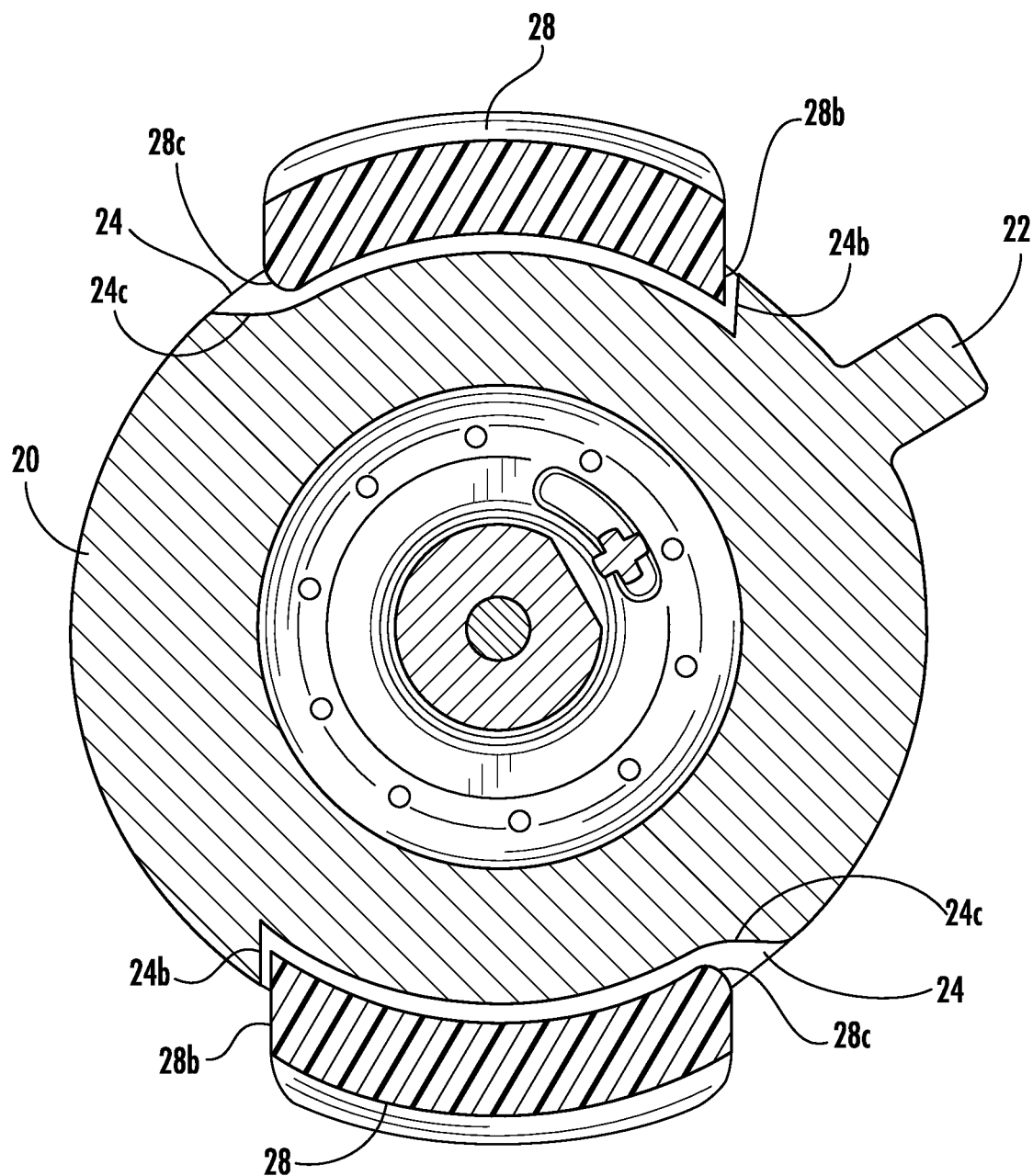
Figure 10:
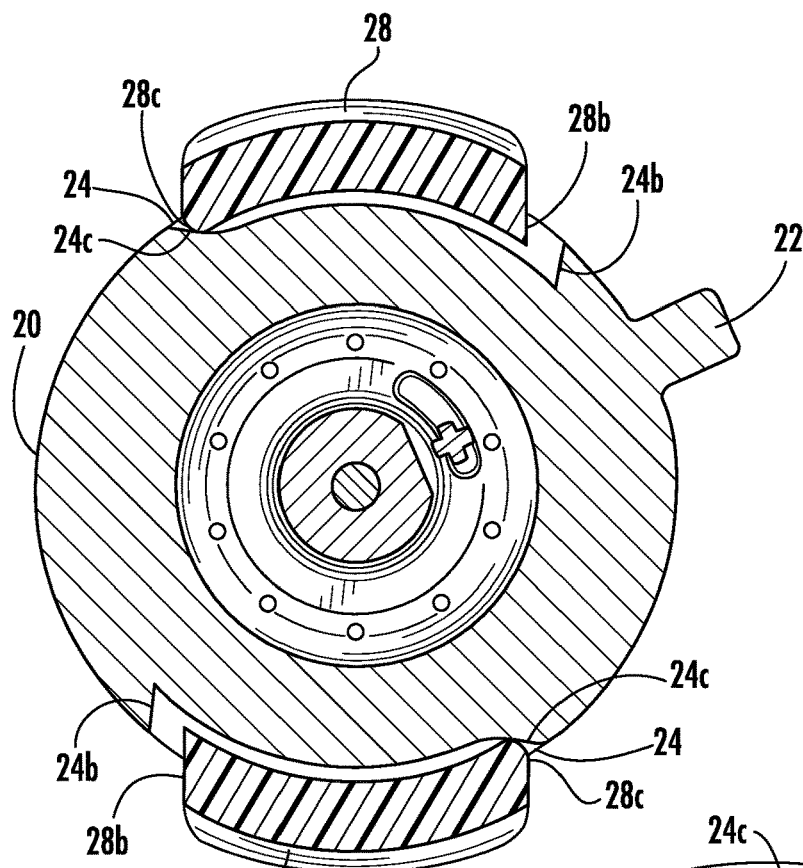
Figure 11:
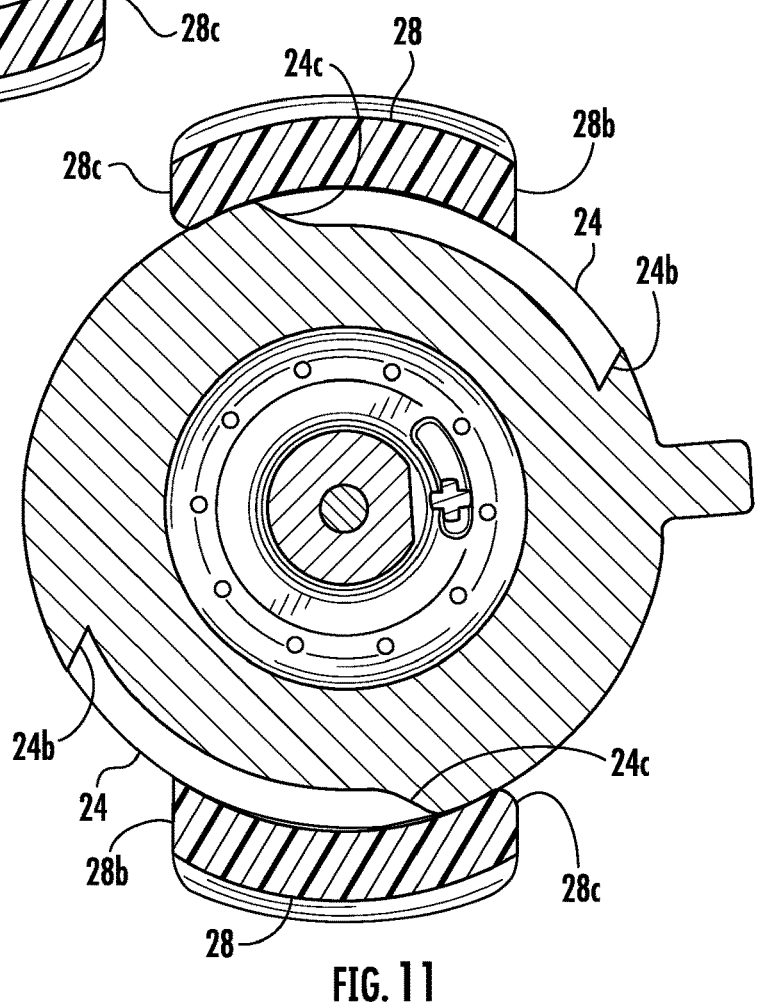
Figure 12:
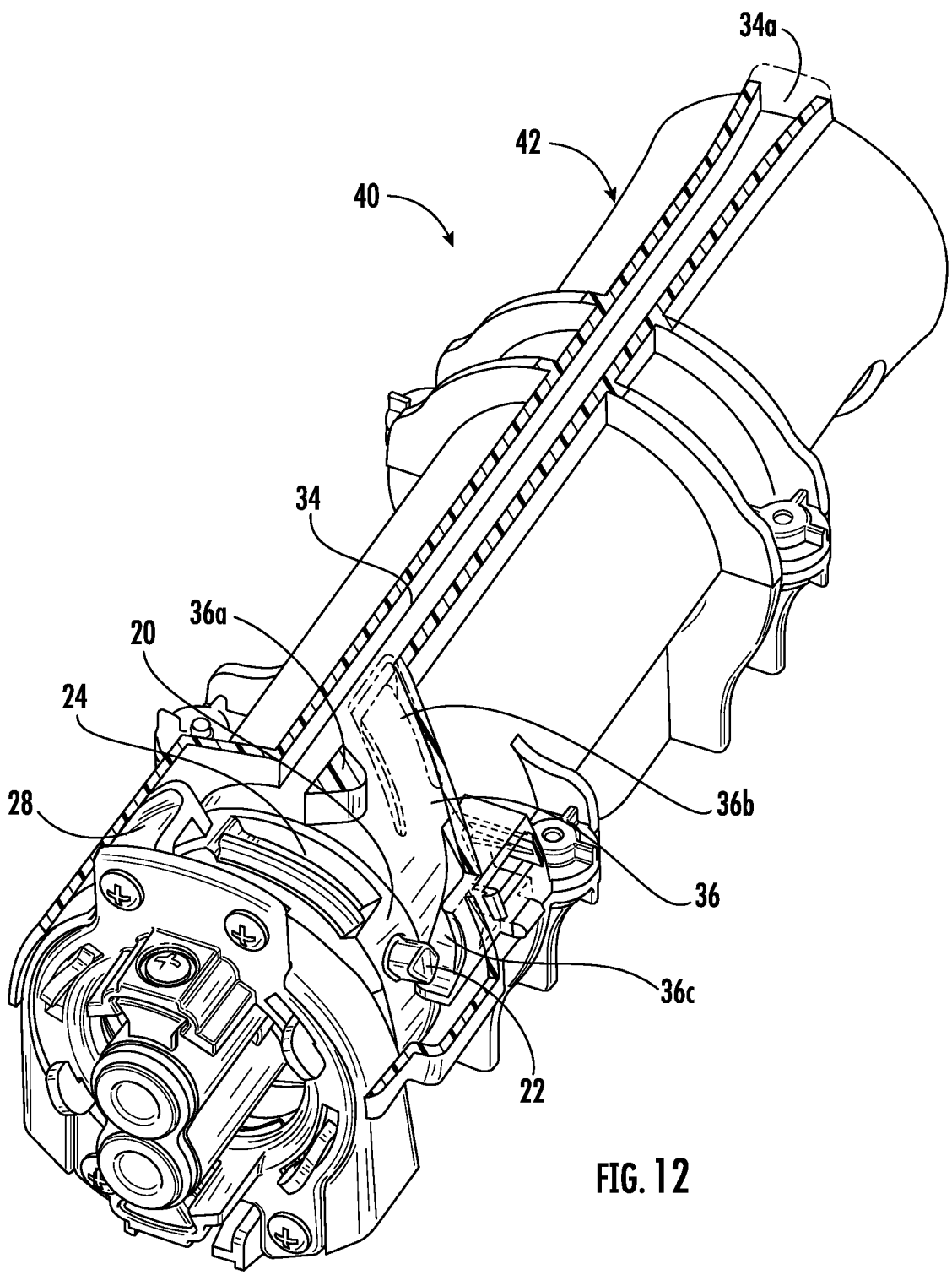
Figure 13:
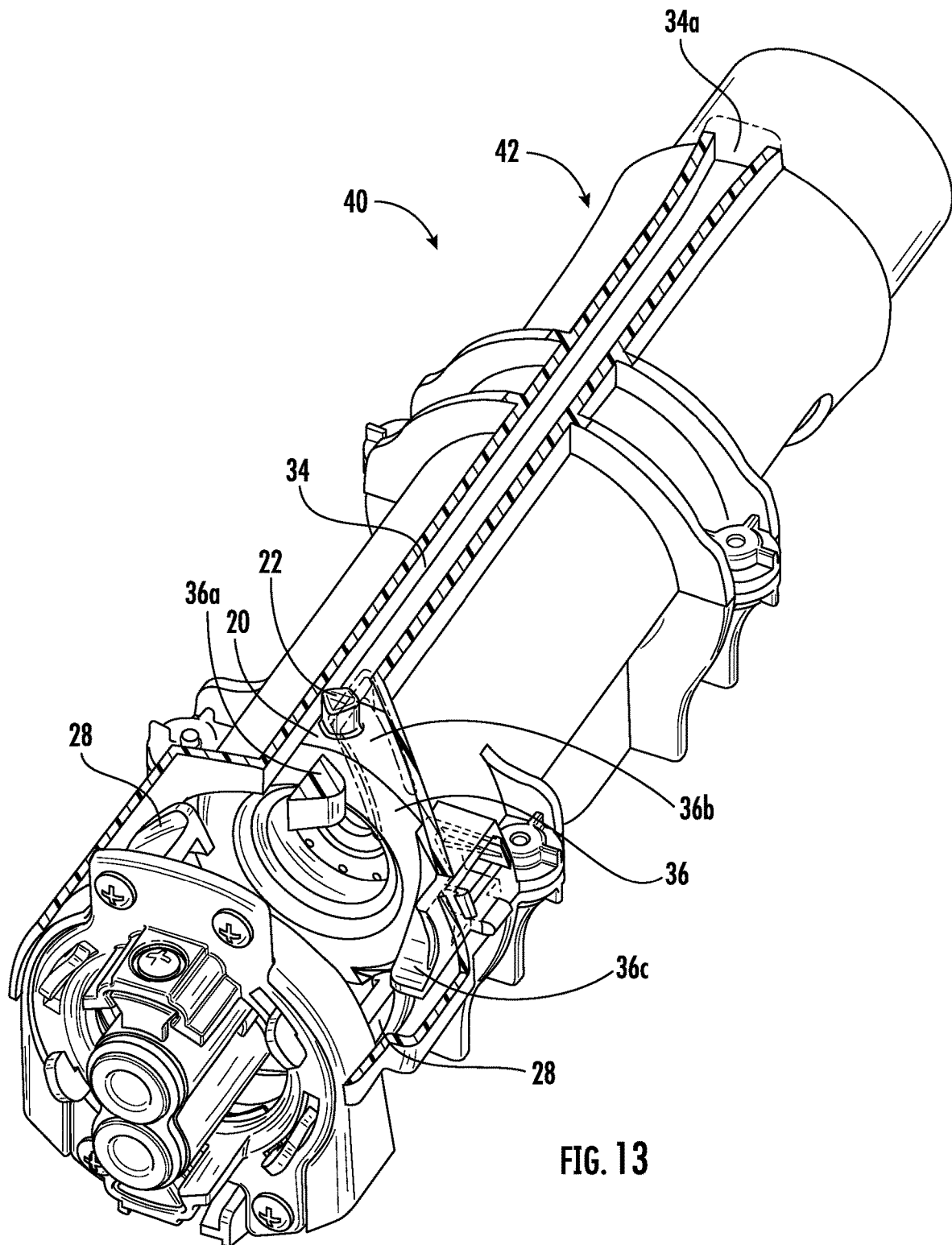

Having thus described embodiments of the invention in general terms, reference will now be made the accompanying drawings, wherein:

FIG. 1 illustrates a perspective view of a filter cartridge, in accordance with an embodiment of the invention;

FIG. 2 illustrates a close-up, side view of an integrated locking head of the filter cartridge, in accordance with an embodiment of the invention;

FIG. 3 illustrates another close-up, side view of the integrated locking head of the filter cartridge, in accordance with an embodiment of the invention;

FIG. 4 illustrates a close-up, side view of the filter cartridge and a portion of a filter cartridge manifold of an appliance, in accordance with an embodiment of the invention;

FIG. 5 illustrates a perspective view of a portion of the filter cartridge manifold, in accordance with an embodiment of the invention;

FIG. 6 illustrates a perspective view of the filter cartridge manifold with the filter cartridge inserted therein, in accordance with an embodiment of the invention;

FIG. 7 illustrates a perspective view of the filter cartridge manifold with the filter cartridge inserted therein with portions of the filter cartridge manifold removed, in accordance with an embodiment of the invention;

FIG. 8 illustrates another perspective view of the filter cartridge manifold with the filter cartridge inserted therein with portions of the filter cartridge manifold removed, in accordance with an embodiment of the invention;

FIG. 9 illustrates a side, cross-section view of the integrated locking head of the filter cartridge and latching mechanisms of the filter cartridge manifold after insertion of the filter cartridge into the filter cartridge manifold, in accordance with an embodiment of the invention;

FIG. 10 illustrates a side, cross-section view of the integrated locking head of the filter cartridge and the latching mechanisms of the filter cartridge manifold after partial rotation of the filter cartridge within the filter cartridge manifold, in accordance with an embodiment of the invention;

FIG. 11 illustrates a side, cross-section view of the integrated locking head of the filter cartridge and the latching mechanisms of the filter cartridge manifold after further rotation of the filter cartridge within the filter cartridge manifold, in accordance with an embodiment of the invention;

FIG. 12 illustrates a perspective view of the filter cartridge and the filter cartridge manifold with portions of the filter cartridge manifold removed after rotation of the filter cartridge within the filter cartridge manifold, in accordance with an embodiment of the invention; and FIG. 13 illustrates a perspective view of the filter cartridge and the filter cartridge manifold with portions of the filter cartridge manifold removed during removal of the filter cartridge, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout. Where possible, any of the advantages, features, functions, devices, and/or operational aspects of any of the embodiments of the present invention described and/or contemplated herein may be included in any of the other embodiments of the present invention described and/or contemplated herein, and/or vice versa.

As used herein, "operatively coupled" may mean that the components may be formed integrally with each other or may be formed separately and coupled together. Furthermore, "operatively coupled" may mean that the components may be formed directly to each other or to each other with one or more components located between the components that are operatively coupled together. Additionally, or alternatively, "operatively coupled" may mean that the components are detachable from each other or that they are permanently coupled together. Furthermore, "operatively coupled" components may mean that the components retain at least some freedom of movement in one or more directions or may be rotated about an axis (i.e., rotationally coupled, pivotally coupled, and/or the like).

As noted, appliances, such as refrigerators, freezers, and/or the like, may include one or more components, such as a water dispenser, an ice maker, and/or the like, which use water from a water supply (e.g., a household water supply and/or the like). Such appliances typically include a water filter that filters water received from the water supply before the water is provided to the one or more components. Such water filters have a useful lifespan that is shorter than the appliance and must be replaced for the appliance to continue to provide properly filtered water. Appliances typically include an opening to permit a user to remove an expired water filter and install a replacement water filter. However, the user may have difficulty determining the correct steps to remove the expired water filter. Furthermore, the user may have difficulty installing the replacement water filter due to a failure to properly align the replacement water filter with a manifold within the appliance, due to a lack of indication that the replacement water filter has been properly installed, and/or the like.

Some embodiments described herein provide a mechanical interlock system for a filter, such as a water filter, which may be included in an appliance. In some embodiments, the mechanical interlock system may include a filter cartridge and a filter cartridge manifold for an appliance push-to-lock mechanism for securing the filter cartridge and a twist-to-unlock mechanism for releasing the filter cartridge. The filter cartridge may have an integrated locking head, which may include a key extending radially outward from the integrated locking head and one or more channels on an outer surface of the integrated locking head. The mechanical interlock system may include a filter cartridge manifold for receiving the filter cartridge, where the filter cartridge manifold includes an insertion and extraction tube and one or more latching mechanisms (e.g., claws). In some embodiments, the key of the integrated locking head may interact with the insertion and extraction tube to properly align the filter cartridge during installation of the filter cartridge and removal of the filter cartridge. Additionally, or alternatively, the one or more latching mechanisms may interact with the one or more channels on the integrated locking head to permit insertion of the filter cartridge, provide an indication that the filter cartridge has been properly installed, prevent rotation of the filter cartridge in an incorrect direction, and permit rotation of the filter cartridge in a correct direction. In some embodiments, the mechanical interlock system may include a stop element to prevent over-rotation of the filter cartridge in the correct direction.

FIG. 1 illustrates a perspective view of a filter cartridge 10, in accordance with an embodiment of the invention. As shown in FIG. 1, the filter cartridge 10 may include a filter body 12, also referred to as a filter housing, which typically encloses a fluid filtration material. The filter body 12 may be substantially cylindrical and may define a first end and a second end along a longitudinal axis. Additionally, or alternatively, the filter body 12 may be slightly conical such that the first end is has a smaller radius than the radius of the second end.

The filter cartridge 10 may include a fluid inlet and outlet 14 as well as an integrated locking head 20, which may be formed into the filter body 12 and/or attached to the filter body 12 as shown in FIG. 1. In some embodiments, the fluid inlet and outlet 14 may be formed in a central portion of the first end of the filter body 12, and the integrated locking head may be formed into the filter body 12 and/or attached to the filter body 12 at a peripheral portion of the first end of the filter body 12. In use, water may pass through the fluid inlet into the filter body 12, be filtered by the fluid filtration material, and pass through the fluid outlet to the appliance.

As shown in FIG. 1, the integrated locking head 20 may include a key 22 and a channel 24. In some embodiments, the key 22 may extend radially outward from the integrated locking head 20 (e.g., from an outer surface of the integrated locking head 20 and/or the like). Although not shown in FIG.

1, the integrated locking head 20 may include another channel positioned on the opposite side of the integrated locking head 20 from the channel 24. In some embodiments, the channels 24 may be positioned and/or formed on an outer surface of the integrated locking head 20. Additionally, or alternatively, the channels 24 may be diametrically opposed on the outer surface of the integrated locking head. In some embodiments, and as described herein, the channels 24 may be structured and/or configured for receiving latching mechanisms, preventing rotation of the filter cartridge 10 in a first direction, and permitting rotation of the filter cartridge 10 in a second direction.

FIG. 2 illustrates a close-up, side view of the integrated locking head 20 of the filter cartridge 10. FIG. 3 illustrates another close-up, side view of the integrated locking head 20 of the filter cartridge 10. As shown in FIG. 2, the channel 24 may include a chamfered edge 24a oriented towards the fluid inlet and outlet 14, a vertical sidewall 24b on a first end of the channel 24, and a filleted or curved sidewall 24c on a second end of the channel 24. As described further herein, the chamfered edge 24a, the vertical sidewall 24b, and the filleted sidewall 24c may interact with corresponding features on a lock mechanism on a filter cartridge manifold. As shown in FIG. 3, the key 22 may be shaped as an extruded rhombus with a tip that is sloped from its center, and, as described further herein, the key 22 may interact with keyways in a tube of the filter cartridge manifold. In some embodiments, the key 22 may have a rhomboid-shape and a radially-outward-facing surface that is sloped radially inward from a center of the radially-outward-facing surface.

FIG. 4 illustrates a close-up, side view of the filter cartridge and a portion of a filter cartridge manifold of an appliance. FIG. 5 illustrates a perspective view of a portion of the filter cartridge manifold. As shown in FIG. 4, the filter cartridge manifold may include a first base component 26a, a locking mechanism including two latching mechanisms 28, and a fluid connector 16. In some embodiments, the first base component 26a may be connected to the locking mechanism and/or the latching mechanisms 28. Additionally, or alternatively, the first base component 26a may be connected to the appliance (e.g., via fasteners and/or the like) and/or may be connected to a second base component 26b (See FIG. 6), which may be connected to the appliance. The first base component 26a and/or the second base component 26b may maintain positioning of the locking mechanism including the latching mechanisms 28 within the appliance, with respect to the filter cartridge manifold, and with respect to the fluid connector 16 in the appliance. The fluid connector 16 of the filter cartridge manifold provides a fluid connection between the internal components of the appliance and the fluid inlet and outlet 14 of the filter cartridge 10.

As shown in FIGS. 4 and 5, the filter cartridge manifold may also include a pusher component 30 that is spring-loaded by a spring element 32 (See FIG. 5). In some embodiments, the spring element 32 is positioned between the pusher component 30 and the first base component 26a and/or the second base component 26b. Additionally, or alternatively, during installation of the filter cartridge 10, the pusher component 30 may provide a compressive force against the integrated locking head 20 that assists with seating the two latching mechanisms 28 in the corresponding channels 24 on opposite sides of the integrated locking head 20 (See FIG. 4).

As shown in FIG. 5, the latching mechanisms 28 may include a chamfered inner edge 28a, a vertical sidewall 28b, and a filleted or curved sidewall 28c. The chamfered inner edge 28a may interact with the chamfered edge 24a of the integrated locking head 20 shown in FIGS. 2 and 3 such that, as the filter cartridge 10 is inserted into the filter cartridge manifold, the latching mechanisms 28 flex radially outward allowing the integrated locking head 20 to insert into the filter cartridge manifold and/or the fluid inlet and outlet 14 to connect to a corresponding fluid connector 16 on the appliance. After the chamfered inner edges 28a pass into the channels 24 of the locking head 20, the latching mechanisms 28 may sit within the channels 24 (See FIG. 4) and lock the filter cartridge 10 within the filter cartridge manifold by preventing movement in a direction along the longitudinal axis that is opposite the insertion direction. The seating of the latching mechanisms 28 within the channels 24 may generate a noise indicating that the filter cartridge 10 is locked in the filter cartridge manifold.

As shown in FIGS. 4 and 5, the latching mechanisms 28 may include a neck portion 28d extending parallel to the longitudinal axis in a direction opposite the insertion direction and a head portion 28e at an end of the neck portion 28d. In some embodiments, the head portion 28e may have a curvature complementary to an outer curvature of the integrated locking head 20. Additionally, or alternatively, the head portion 28e may be angled inward from an outer edge to an inner edge, which may guide the integrated locking head 20 into a space between the latching mechanisms 28 during insertion.

In some embodiments, and as shown in FIGS. 4 and 5, the outer edge of the head portion may extend radially outward beyond the neck portion 28d, which may improve an ability of the latching mechanisms 28 to guide the integrated locking head 20 into a space between the latching mechanisms 28 during insertion. Additionally, or alternatively, and as also shown in FIGS. 4 5, the inner edge of the head portion 28e may extend radially inward from the neck portion 28d, which may permit the latching mechanisms 28 to sit in the channels 24 and prevent movement of the filter cartridge 10 in a direction opposite the insertion direction. In some embodiments, and as also shown in FIGS. 4 and 5, an angle α between the inner edge of the head portion and the neck portion may be less than 90 degrees, which may improve an ability of the latching mechanisms 28 to prevent movement of the filter cartridge 10 in a direction opposite the insertion direction. In some embodiments, and as described herein, the latching mechanisms 28 may be structured and/or configured to prevent, after being received by the channels 24, movement of the filter cartridge 10 in a direction along the longitudinal axis that is opposite an insertion direction, prevent rotation of the filter cartridge 10 in a first direction, and permit rotation of the filter cartridge 10 in a second direction.

FIG. 6 illustrates a perspective view of the filter cartridge manifold 40 with the filter cartridge inserted therein. FIG. 7 illustrates a perspective view of the filter cartridge manifold with the filter cartridge inserted therein with portions of the filter cartridge manifold removed. As shown in FIGS. 6 and 7, the filter cartridge manifold 40 may include an insertion and extraction tube 42 having two keyways 34 and 36 (e.g., a primary keyway 34 and a secondary keyway 36) that intersect. In some embodiments, keyway 34 may be straight and extend parallel to the longitudinal axis of the filter cartridge 10. When a user inserts the filter cartridge 10, the key 22 on the integrated locking head 20 may pass through keyway 34, and keyway 34 may prevent rotation of the filter cartridge 10 during insertion.

In some embodiments, when the key 22 is positioned in the keyway 34, the keyway 34 prevents rotation of the filter cartridge 10, aligns one of the two latching mechanisms 28 with one of the two channels 24 and another of the two latching mechanisms 28 with another of the two channels 24, and aligns the fluid inlet and outlet 14 of the filter cartridge 10 with the fluid connector 16 of an appliance. In some embodiments, and as shown in FIGS. 6 and 7, the insertion and extraction tube 42 may include an insertion end 34a for receiving and guiding the key 22 into the keyway 34, where the insertion end 34a is wider than the keyway 34, which may improve the ability of a user to insert the key 22 into the keyway 34 and the filter cartridge 10 into the appliance.

As shown in FIGS. 6 and 7, keyway 36 may be curved and may include a wedge element 36a and a leaf spring element 36b. The wedge element 36a may be configured to guide the key 22 into the keyway 36 after the pusher component 30 pushes the filter cartridge 10. In some embodiments, keyway 36 may have an entry end and an exit end, where the exit end of keyway 36 connects to keyway 34. The leaf spring element 36b, as shown in FIG. 6, may be biased downward to prevent the key 22 from entering keyway 36 during insertion and to flex upward to permit the key 22 to exit keyway 36 and enter keyway 34 during extraction of the filter cartridge 10. Although the leaf spring element 36b shown in FIG. 6 is biased downward into keyway 36, the leaf spring element 36b may be biased into the keyway 36 from another direction (e.g., from a side of keyway 36 and/or the like). The curved shape of keyway 36 may reduce any inertia the filter cartridge 10 may have during extraction (e.g., due to being pushed by the pusher component 30).

FIG. 8 illustrates another perspective view of the filter cartridge manifold 40 with the filter cartridge inserted therein with portions of the filter cartridge manifold 40 removed. As shown in FIG. 8, the end portion of keyway 34 may include an end portion with a sidewall 34b and/or the like that interacts with the key 22 to prevent clockwise rotation (e.g., from a user's perspective) of the filter cartridge 10 but permits counterclockwise rotation of the key 22 and the filter cartridge 10. As also shown in FIG. 8, the filter cartridge manifold 40 may include a stop element 36c that interacts with the key 22 to prevent over-rotation of the filter cartridge 10 in a counterclockwise direction. In some embodiments, the stop element 36c have a curved surface to guide the key 22 into keyway 36.

FIG. 9 illustrates a side, cross-section view of the integrated locking head 20 of the filter cartridge and latching mechanisms 28 of the filter cartridge manifold after insertion of the filter cartridge into the filter cartridge manifold. As shown in FIG. 9, the inner radius of the latching mechanisms 28 is less than the outer radius of the integrated locking head 20, such that the latching mechanisms 28, when seated in the channels 24, prevent movement of the filter cartridge 10 in a direction opposite the insertion direction. As also shown in FIG. 9, the vertical sidewalls 28b of the latching mechanisms 28 may interact with the vertical sidewalls 24b of the channels 24 in the integrated locking head 20 to prevent clockwise rotation (e.g., from a user's perspective) of the filter cartridge 10.

FIG. 10 illustrates a side, cross-section view of the integrated locking head 20 of the filter cartridge and the latching mechanisms 28 of the filter cartridge manifold after partial rotation of the filter cartridge within the filter cartridge manifold. As shown in FIG. 10, the filleted sidewalls 28c may interact with the filleted sidewalls 24c of the channels 24 to permit counterclockwise rotation (e.g., from the user's perspective) of the filter cartridge 10.

FIG. 11 illustrates a side, cross-section view of the integrated locking head 20 of the filter cartridge and the latching mechanisms 28 of the filter cartridge manifold after further rotation of the filter cartridge within the filter cartridge manifold. As shown in FIG. 10, the filleted sidewalls 28c may interact with the filleted sidewalls 24c of the channels 24 to force, after sufficient counterclockwise rotation (e.g., from the user's perspective) of the filter cartridge 10, the two latching mechanisms 28 to flex radially outward and slide over the outer circumference of the integrated locking head 20, thereby unlocking the integrated locking head 20 from the filter cartridge manifold.

FIG. 12 illustrates a perspective view of the filter cartridge and the filter cartridge manifold 40 with portions of the filter cartridge manifold 40 removed after rotation of the filter cartridge within the filter cartridge manifold 40. As shown in FIG. 12, after a user rotates the filter cartridge in a counterclockwise direction, from the user's perspective, the latching mechanisms 28 may slide out of the channels 24 (e.g., due to the filleted sidewalls 28c of the latching mechanisms 28 and the filleted sidewalls 24c of the channels 24 as described with respect to FIGS. 9-11), flex radially outward, and slide over the outer circumference of the integrated locking head 20. Furthermore, and as shown in FIG. 12, after the user rotates the filter cartridge in the counterclockwise direction, the key 22 rotates towards the stop element 36c. As the filter cartridge becomes unlocked from filter cartridge manifold 40 due to the latching mechanisms 28 sliding out of the channels 24, the pusher component 30, which is spring-loaded by the spring element 32 (See FIG. 5), may push the filter cartridge 10 in a direction opposite the insertion direction causing the key 22 to enter keyway 36. As described herein, the wedge element 36a and/or the stop element 36c may guide the key 22 into keyway 36. Furthermore, as the user pulls the filter cartridge in a direction opposite the insertion direction, the key 22 may pass through keyway 36, and the leaf spring element 36b may flex to permit the key 22 to pass through keyway 36.

FIG. 13 illustrates a perspective view of the filter cartridge and the filter cartridge manifold 40 with portions of the filter cartridge manifold 40 removed during removal of the filter cartridge. As shown in FIG. 13, as the user pulls the filter cartridge in a direction opposite the insertion direction, the key 22 may exit keyway 36 and enter keyway 34. The user may continue to pull the filter cartridge, and the key 22 may pass through keyway 34 toward the insertion end 34a until the filter cartridge is completely removed from the filter cartridge manifold 40 and/or the appliance.

In some embodiments, the present invention embraces a method of inserting a filter cartridge into a filter manifold and/or removing a filter cartridge from a filter manifold. First, the method may include aligning the key 22 (FIGS. 1-3) with the insertion end 34a of keyway 34 of the insertion and extraction tube 42 (FIGS. 6-8) and inserting, in an insertion direction, the filter cartridge 10 into the filter cartridge manifold 40 such that the key 22 passes through keyway 34. While inserting the filter cartridge 10 in the insertion direction, the leaf spring element 36b (FIGS. 6-8) typically prevents the key 22 from entering keyway 36. Next, the method may include engaging the integrated locking head 20 with the latching mechanisms 28 (FIGS. 4-5) and forcing the latching mechanisms 28 to flex radially outward. The method may also include engaging the integrated locking head 20 with the pusher component 30 (FIGS. 4-5) and overcoming a force applied by the pusher component 30 to the integrated locking head 20 in a direction opposite the insertion direction. The method may further include, after forcing the latching mechanisms 28 to flex radially outward, positioning the latching mechanisms 28 in the channels 24 (FIGS. 4 and 7-9). The method may also include applying a force, with the pusher component 30, to the integrated locking head 20 in a direction opposite the insertion direction after the latching mechanisms 28 are positioned in the channels 24 and preventing movement of the filter cartridge 10 in the direction opposite the insertion direction. In some embodiments, the method may include, after the latching mechanisms 28 are positioned in the channels 24, preventing, with the vertical sidewalls 24b of the channels 24 (FIGS. 2 and 9-11) and the vertical sidewalls 28b of the latching mechanisms 28 (FIGS. 5 and 9-11), rotation of the filter cartridge 10 in a first direction (e.g., a clockwise direction).

As noted, the present invention may embrace a method of removing a filter cartridge from a filter manifold. The method may include, after the latching mechanisms 28 are positioned in the channels 24, permitting, with the filleted sidewalls 24c of the channels 24 (FIGS. 2 and 9-11) and the filleted sidewalls 28c of the latching mechanisms 28 (FIGS. 5 and 9-11), rotation of the filter cartridge 10 in a second direction opposite the first direction (e.g., a counterclockwise direction). The method may include, after the latching mechanisms 28 are positioned in the channels 24, rotating the filter cartridge 10 in the second direction and forcing, with the filleted sidewalls 24c of the channels 24 and the filleted sidewalls 28c of the latching mechanisms 28, the latching mechanisms 28 to flex radially outward and engage the outer surface of the integrated locking head 20 (FIGS. 11-12).

In some embodiments, the method may include, after forcing the latching mechanisms 28 to flex radially outward and engage the outer surface of the integrated locking head 20, pushing, with the pusher component 30, the integrated locking head 20 and the filter cartridge 10 in an extraction direction opposite the insertion direction, such that the key 22 enters keyway 36. The method may include preventing over-rotation of the filter cartridge 10 with the stop element 36c (FIG. 12). Additionally, or alternatively, the method may include guiding the key 22 into keyway 36 with the wedge element 36a (FIGS. 7-8 and 12-13). The method may also include pulling the filter cartridge 10 in the extraction direction such that the key 22 passes through keyway 36, pushes the leaf spring element 36b upward, and enters keyway 34 (FIG. 13). The method may also include, while pulling the filter cartridge 10 in the extraction direction and while the key 22 passes through keyway 36, rotating the filter cartridge 10 in the first direction (e.g., a clockwise direction). The method may further include pulling the filter cartridge 10 in the extraction direction such that the key 22 passes through keyway 34 and the insertion end 34a and withdrawing the filter cartridge 10.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments may be configured without departing from the scope and spirit of the invention. Therefore, it is to be understood that, within the scope of the appended claims, the invention may be practiced other than as specifically described herein.

What is claimed is:

1. A filter cartridge, comprising:
a filter body having a first end, a second end, and a longitudinal axis;
a fluid inlet and outlet at the first end of the filter body; and
an integrated locking head on the first end of the filter body, wherein the integrated locking head comprises a channel on an outer surface of the integrated locking head, wherein the channel is configured to receive a latching mechanism of a filter cartridge manifold, and wherein the channel comprises:
a filleted sidewall at a first end of the channel;
a vertical sidewall at a second end of the channel; and
a chamfered edge oriented towards the fluid inlet and outlet.

2. The filter cartridge of claim 1, wherein, after insertion of the filter cartridge into the filter cartridge manifold, a chamfered inner edge of the latching mechanism is structured to sit within the channel and prevent movement of the filter cartridge in a direction along the longitudinal axis that is opposite an insertion direction.

3. The filter cartridge of claim 1, wherein, after insertion of the filter cartridge into the filter cartridge manifold, a vertical sidewall of the latching mechanism is structured to interact with the vertical sidewall of the channel to prevent rotation of the filter cartridge in a first direction.

4. The filter cartridge of claim 1, wherein, after insertion of the filter cartridge into the filter cartridge manifold, a filleted sidewall of the latching mechanism is structured to interact with the filleted sidewall of the channel to permit rotation of the filter cartridge in a second direction.

5. The filter cartridge of claim 4, wherein, after insertion of the filter cartridge into the filter cartridge manifold and during rotation of the filter cartridge in the second direction, the filleted sidewall of the latching mechanism is structured to interact with the filleted sidewall of the channel to force the latching mechanism to flex radially outward and slide over an outer circumference of the integrated locking head.

6. The filter cartridge of claim 1, wherein the channel is a first channel, wherein the integrated locking head comprises a second channel on the outer surface of the integrated locking head, and wherein the first channel and the second channel are diametrically opposed on the outer surface of the integrated locking head.

7. The filter cartridge of claim 1, wherein the integrated locking head comprises a key extending radially outward from the integrated locking head.

8. The filter cartridge of claim 7, wherein, during insertion of the filter cartridge into a filter cartridge manifold, the key is structured to pass through a primary keyway of an insertion and extraction tube of the filter cartridge manifold.

9. The filter cartridge of claim 7, wherein, when the key is positioned in a primary keyway of an insertion and extraction tube of the filter cartridge manifold, the primary keyway is structured to prevent rotation of the filter cartridge.

10. The filter cartridge of claim 7, wherein the key has a rhomboid-shape and a radially-outward-facing surface that is sloped radially inward from a center of the radially-outward-facing surface.

11. A method, comprising:
providing a filter cartridge comprising a filter body having a first end, a second end, and a longitudinal axis, a fluid inlet and outlet at the first end of the filter body, and an integrated locking head, wherein the integrated locking head comprises a channel on an outer surface of the integrated locking head, and wherein the channel is structured to receive a latching mechanism, and wherein the channel comprises:
a filleted sidewall at a first end of the channel;
a vertical sidewall at a second end of the channel; and
a chamfered edge oriented towards the fluid inlet and outlet;
inserting, in an insertion direction, the filter cartridge into a filter cartridge manifold of an appliance, wherein the filter cartridge manifold comprises the latching mechanism;
while inserting, engaging the integrated locking head with the latching mechanism forcing the latching mechanism to flex radially outward; and
while inserting and after forcing the latching mechanism to flex radially outward, positioning the latching mechanism in the channel.

12. The method of claim 11, comprising, while inserting, overcoming a force applied to the integrated locking head in an extraction direction opposite the insertion direction.

13. The method of claim 11, wherein the integrated locking head comprises a key extending radially outward from the integrated locking head, the method comprising, before inserting, aligning the key with a keyway of the filter cartridge manifold.

14. The method of claim 11, comprising, while the latching mechanism is positioned in the channel:
preventing movement of the filter cartridge in an extraction direction opposite the insertion direction; and
preventing, with the vertical sidewall of the channel and a vertical sidewall of the latching mechanism, rotation of the filter cartridge in a first direction.

15. The method of claim 14, comprising, while the latching mechanism is positioned in the channel, permitting, with the filleted sidewall of the channel and a filleted sidewall of the latching mechanism, rotation of the filter cartridge in a second direction opposite the first direction.

16. The method of claim 15, comprising, after positioning the latching mechanism in the channel, rotating the filter cartridge in the second direction.

17. The method of claim 16, comprising, while rotating the filter cartridge in the second direction, forcing, with the filleted sidewall of the channel and a filleted sidewall of the latching mechanism, the latching mechanism to flex radially outward and engage an outer surface of the integrated locking head.

18. The method of claim 17, comprising, after forcing the latching mechanism to flex radially outward and engage the outer surface of the integrated locking head, pushing the integrated locking head in an extraction direction opposite the insertion direction.

19. The method of claim 17, wherein the integrated locking head comprises a key extending radially outward from the integrated locking head, the method comprising, after forcing the latching mechanism to flex radially outward and engage an outer surface of the integrated locking head, pulling the filter cartridge in an extraction direction opposite the insertion direction causing the key to enter a secondary keyway, of the filter cartridge manifold, that intersects with a primary keyway, of the filter cartridge manifold, through which the key passed while inserting the filter cartridge into the filter cartridge manifold.

20. The method of claim 19, comprising:
while pulling the filter cartridge in the extraction direction, pulling the key through the secondary keyway and into the primary keyway; and
while pulling the filter cartridge in the extraction direction and pulling the key through the secondary keyway, rotating the filter cartridge in the first direction.

21. The method of claim 20, comprising:
while pulling the filter cartridge in the extraction direction, pulling the key through the primary keyway; and
withdrawing the filter cartridge from the appliance.

22. A mechanical interlock system, comprising:
the filter cartridge and the filter cartridge manifold of claim 7, wherein the integrated locking head comprises a key, and wherein the filter cartridge manifold comprises:
an insertion and extraction tube for receiving the key, wherein the insertion and extraction tube comprises:
a primary keyway; and
a secondary keyway, wherein the secondary keyway has an entry end and an exit end, and wherein the exit end of the secondary keyway connects to the primary keyway; and
the latching mechanism, wherein the latching mechanism is structured to:
prevent, after being received by the channel, movement of the filter cartridge in a direction along the longitudinal axis that is opposite an insertion direction;
prevent rotation of the filter cartridge in a first direction; and
permit rotation of the filter cartridge in a second direction.

23. The mechanical interlock system of claim 22, wherein, when the key is positioned in the primary keyway, the primary keyway prevents rotation of the filter cartridge, aligns the latching mechanism with the channel, and aligns the fluid inlet and outlet of the filter cartridge with a fluid connector of the filter cartridge manifold, and wherein the filter cartridge manifold is positioned in an appliance.

24. The mechanical interlock system of claim 22, wherein an end portion of the primary keyway comprises a sidewall configured to interact with the key to prevent rotation of the filter cartridge in the first direction, and wherein the end portion permits rotation of the filter cartridge in the second direction.

25. The mechanical interlock system of claim 22, wherein after insertion of the filter cartridge into the filter cartridge manifold, a vertical sidewall of the latching mechanism interacts with the vertical sidewall of the channel to prevent rotation of the filter cartridge in the first direction.

26. The mechanical interlock system of claim 22, wherein after insertion of the filter cartridge into the filter cartridge manifold, a filleted sidewall of the latching mechanism interacts with the filleted sidewall of the channel to permit rotation of the filter cartridge in the second direction.

27. The mechanical interlock system of claim 22, wherein the filter cartridge manifold comprises:
   a spring element; and
   a pusher component spring-loaded by the spring element and configured to provide a compressive force against the integrated locking head.

28. The mechanical interlock system of claim 24, wherein after insertion of the filter cartridge into the filter cartridge manifold and during rotation of the filter cartridge in the second direction:
   the filleted sidewall of the latching mechanism interacts with the filleted sidewall of the channel to force the latching mechanism to flex radially outward and slide over an outer circumference of the integrated locking head; and
   the key rotates toward the entry end of the secondary keyway.

\* \* \* \* \*